Nov. 7, 1950    L. T. MEISTER    2,528,534
APPARATUS FOR TESTING CENTRIFUGALLY
ACTUATED ELEMENTS

Filed March 9, 1945    2 Sheets-Sheet 1

Inventor

LEO T. MEISTER,

By C. E. Herrstrom & H. E. Thibodeau
Attorneys

Nov. 7, 1950
L. T. MEISTER
2,528,534
APPARATUS FOR TESTING CENTRIFUGALLY
ACTUATED ELEMENTS
Filed March 9, 1945
2 Sheets-Sheet 2
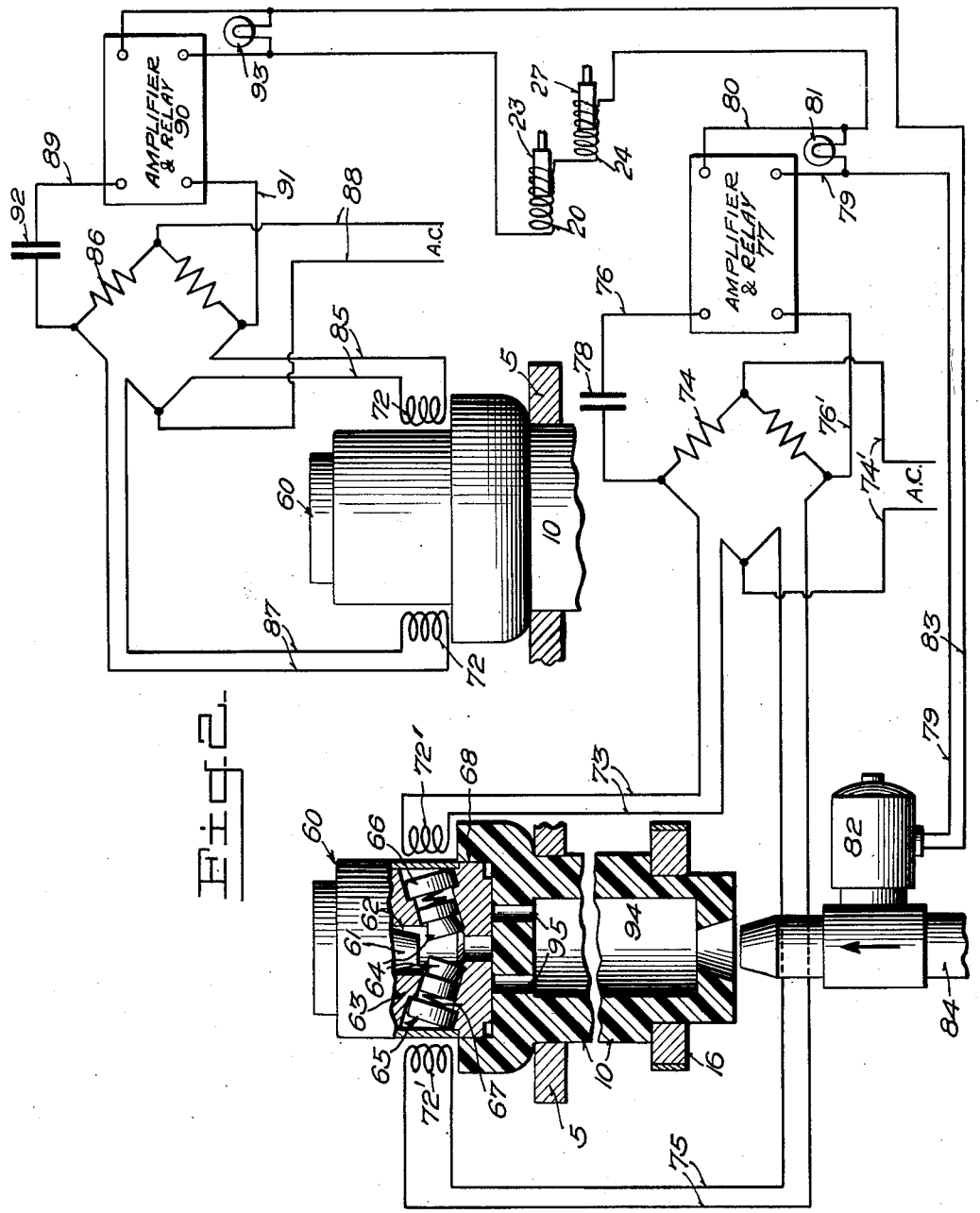
Inventor
Leo T. Meister, Patented Nov. 7, 1950

2,528,534

UNITED STATES PATENT OFFICE 2,528,534

APPARATUS FOR TESTING CENTRIFUGALLY ACTUATED ELEMENTS

Leo T. Meister, Bradley Beach, N. J.

Application March 9, 1945, Serial No. 581,817

10 Claims. (Cl. 73—167)

(Granted under the act of March 3, 1883, as amended April 30, 1928; 370 O. G. 757)

The invention described herein may be manufactured and used by or for the Government for governmental purposes without the payment of any royalty thereon.

This invention relates to an apparatus for testing the operation of centrifugally actuated elements and more particularly to an apparatus designed for testing plungers of projectile fuzes which are moved outwardly by centrifugal force due to the rotation of a projectile, in which the fuze is mounted, during flight, for arming the fuze.

It is a primary object of this invention to provide a device which is electrically operated through a current induced by the centrifugally actuated plungers, when magnetized and rotated, to control the operation of the apparatus for moving holders, containing the fuzes to be tested, intermittently to testing stations at which the fuzes are rotated at different speeds, for testing the arming and disarming action of the plungers.

Still a further aim of the invention is to provide a construction wherein two or more fuzes are tested simultaneously for different results and by means of which the apparatus will not function if either one of the fuzes being tested is imperfect, said apparatus being provided with means for visually indicating the imperfect fuze.

More particularly, it is intended to provide a novel means by which centrifugally actuated fuze elements are initially rotated at a speed sufficient to cause the elements of a properly operating fuze to move outwardly in response to centrifugal force; and thereafter and at another location to again rotate the fuze at a speed at which the elements of a properly operating fuze are unresponsive to the centrifugal force produced; and to provide means in cooperation with said elements for inducing a current if they function in their intended manner, to visually indicate the functioning thereof and to electrically actuate means for advancing other fuzes, to be tested, into a position to be tested, and for removing from the apparatus, the fuzes which have successfully passed the test.

Other objects and advantages of the invention will hereinafter become more fully apparent from the following description of the drawings, which illustrate a preferred embodiment thereof, and wherein:

Figure 2 is a diagrammatic view, partly in vertical section and partly in side elevation, of a portion of the apparatus.

Figure 1:
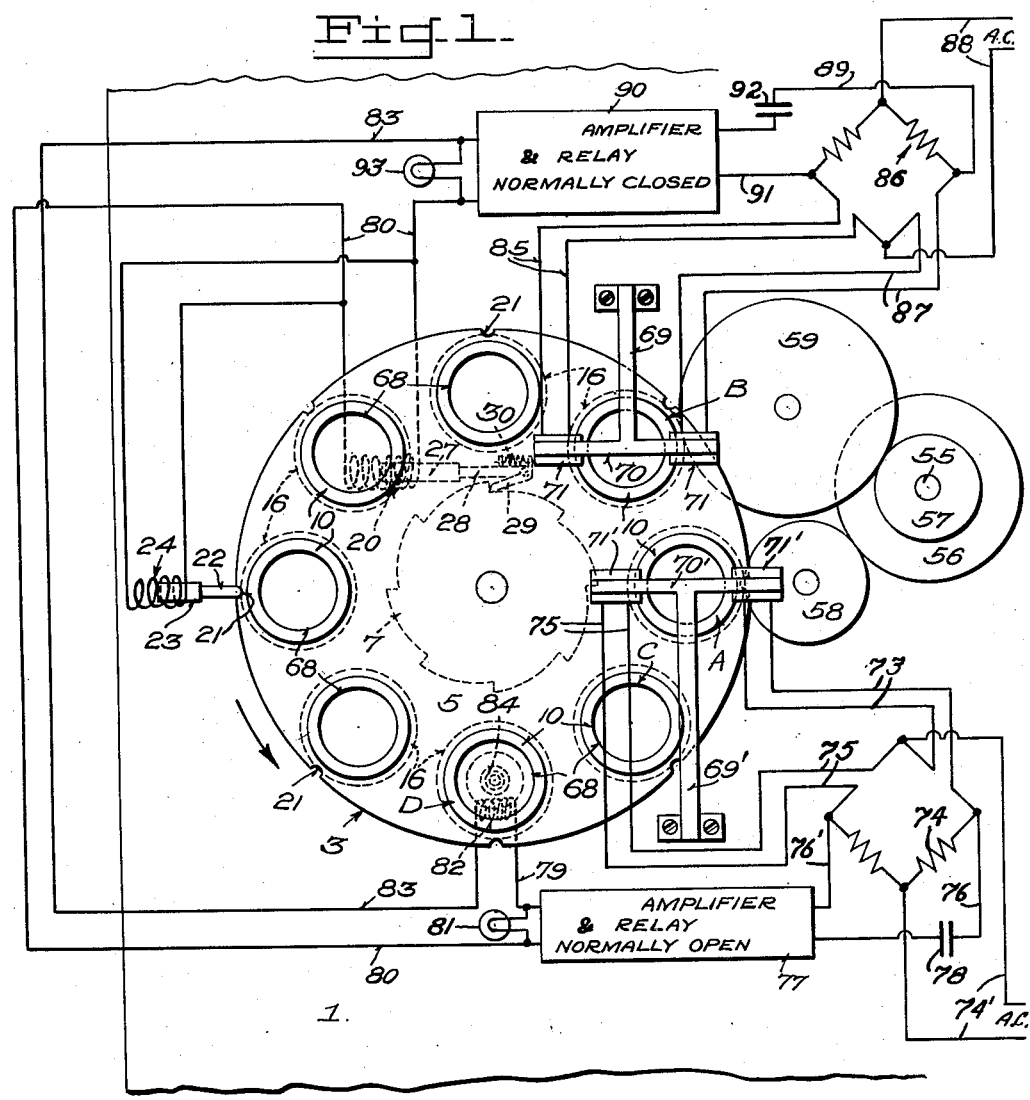
Figure 1 is a diagrammatic view, partly in top plan, of the apparatus.

Referring more particularly to the drawings, 3 designates generally the mechanical portion of the testing apparatus in its entirety and which is of the same construction as the mechanical part of the testing apparatus shown in my prior United States Patents No. 2,355,092, issued August 8, 1944, and 2,421,036, issued May 27, 1947, and to which reference is made for a full and complete illustration and description of the mechanical apparatus, which includes a base 1 above which is rotatably supported a support or disk 5, to which is connected a ratchet wheel 7, which is mounted beneath the disk 5. The disk 5 forms a support for a plurality of fuze holders or spindles 10 of a nonmagnetic material which are rotatably mounted therein and adjacent the periphery thereof and which are circumferentially spaced from one another. The number of spindles or holders 10 may be varied as desired. The number of teeth in ratchet wheel 7 correspond to the number of spindles 10, and said ratchet wheel functions in conjunction with an electromagnetic means 20, which includes a plunger 27 having a rod 28, forming an extension thereof and on which is pivotally mounted a pawl 29 which normally is held in engagement with the teeth of the ratchet wheel 7 by a spring 30. The disk 5 is provided with notches 21 in its rims to receive the reduced end 22 on plunger 23 of a plunger electromagnet 24, for locking the disk 5, temporarily, at the end of each step by step motion of the disk 5, in response to the operation of the electromagnetic means 20 on the ratchet wheel 7. The electromagnets 20 and 24 are provided with springs, not shown, for projecting the plungers 27 and 23, respectively, outwardly, when said electromagnets are not energized.

The apparatus 3 is provided with two stations A and B where the testing operation is performed. At these stations the spindles 10 are revolved in the disk 5 by means of a friction drive from an electric motor, not shown, and which drives the shaft 55 which is journaled in the base 1. Shaft 55 has two drive wheels 56 and 57 keyed thereto and in which the latter is smaller in diameter than the former. Drive wheel 56 is in frictional contact with a friction idler wheel 58, which in turn, frictionally drives a spindle 10 at the testing station A by frictional engagement with a friction collar 16, which is keyed to the spindle 10. A friction idler wheel 59, which is substantially greater in diameter than the idler wheel 58, is driven by the friction wheel 57 and in turn drives a spindle 10, located at station B by engagement with the friction collar 16 thereof.

For a more detailed disclosure of the mechanical parts just described, reference may be had to my patents mentioned, wherein corresponding parts are identified by the same reference numerals as in the present case.

Referring to Figure 2 a fuze, designated generally 60 and of conventional construction, is shown. Fuze 60 illustrates one type of device of a character capable of being tested by the present invention and includes an element 61 which is slidably mounted lengthwise in the fuze in a bore 62 and which is connected to a firing pin in the fuze, not shown, so as to be mounted for reciprocation therewith. Mounted substantially radially of the fuze housing 63 are two plungers 64 which are disposed in substantially opposed relationship to one another and which are slidably mounted in bores 65. The bores 65 contain stop members 66 which are disposed therein behind plungers 64 and which form abutments for expansion springs 67, which urge the plungers 64 inwardly and to their positions of Figure 2, in obstructing relationship to the element 61, so as to prevent said element from being moved inwardly or downwardly beyond a certain point relatively to the housing 63, which point is insufficient to permit the firing pin, not shown, to function to detonate a primer, not shown. It will be apparent that fuze 60 when mounted in a rotatable type projectile, not shown, and when in flight will be rotated by the projectile to cause the plungers 64 to be moved outwardly by centrifugal force against the action of the springs 67 and out of the path of movement of the element 61, so that upon impact of the projectile with a target, the element 61 is driven rearwardly or downwardly, as seen in Figure 2, sufficiently to allow the firing pin of the fuze 60 to detonate the primer.

It is a purpose of this invention to provide an apparatus which will produce substantially the same rate of rotation of the fuze 60 as is imparted to it by rotation with the projectile, in order to test the operation of the plungers 64, and thereafter to again rotate the fuze 60 at a reduced speed, at which the plungers 64 should not be moved outwardly by centrifugal force, to ascertain if the plungers operate correctly. Each spindle 10 is provided with a socket 68 in its upper end, shaped and sized to seat a fuze 60 and to frictionally hold the fuze sufficiently to cause it to rotate with the spindle 10. The spindles 10 as previously mentioned, are formed of a nonmagnetic material, preferably of plastic and the fuzes 60 are also formed of nonmagnetic material except for the plungers 64 which, prior to testing, are magnetized.

The structure hereinafter to be described constitutes the improvement of the present invention over my prior patent, and includes a pair of brackets 69 and 69' which are suitably fastened to the base 1 and which are provided with cross heads 70 and 70' on the ends of which are mounted coil holders 71 and 71'. Holders 71' are located at station A and holders 71 are located at station B. The coil holders 71 are positioned so that the coils 72 supported thereby are in diametrically opposed relation with respect to the axis of rotation of the spindle 10 located at station B. Likewise, the coil holders 71' are positioned so that the coils 72' supported thereby are in like relation with respect to the axis of rotation of the spindle at station A. In each case, the coils are located as closely as possible to the external surface of the fuze at that station whereby, when the magnetized plungers 64 are in their radially outward positions during rotation of the fuzes being tested, an alternating voltage is induced in each coil. On the other hand, when the aforesaid plungers remain in their radially inward positions during testing, substantially no voltage is induced in the coils.

One coil 72', located at station A, is connected in one side of a bridge 74 by leads 73. The other coil 72' is connected in a second side of bridge 74 by leads 75. One pair of opposed terminals of bridge 74 are connected to a source of A.C. by leads 74'. The resistances in the two remaining sides of the bridge are so related to the resistances of coils 72' that the bridge is balanced when no voltage is induced in coils 72'. At such times, no potential difference exists between the other pair of opposed terminals of the bridge, which terminals are connected by leads 76 and 76' to a normally open amplifier and relay 77. At such times, of course, the output circuit from 77 remains open. A condenser 78 may be interposed in lead 76. Leads 80 and 83 extend from the output terminals of amplifier-relay 77 and are shunted by a signal lamp 81. The conductor 79 leads to one contact of a conventional electrical magnetic shutoff valve 82 and a conductor 83 leads from the other contact thereof. The shutoff valve 82 controls the passage of a conduit 84 which is connected to a source of compressed air, not shown.

One of the induction coils 72, located at station B, is provided with a pair of conductors 85 which extend therefrom to one side of an electrical balanced bridge 86, and the other coil 72 thereof has a pair of electric conductors 87 which are connected to the other side of the bridge 86. The bridge 86, like bridge 74, is energized by a source of alternating current through a pair of conductors 88 and is provided with a conductor 89 leading therefrom to the input side of an amplifier and normally closed relay 90, and a second conductor 91, leading from the other side of the bridge 86 to the other input post of the amplifier 90. Conductor 89 is provided with a condenser 92. The opposite end of the electrical conductor 89 is connected to one post of the output side of the amplifier 90, and the opposite end of the conductor 83, is connected at its opposite end, to the other post of the output side of amplifier 90. An electric lamp bulb 93 is connected to the conductors 80 and 83, adjacent amplifier 90.

Referring to Fig. 1, the contacts of relay 77, coil of valve 82, electromagnets 20 and 24 and the contacts of relay 90, are all connected in series so that their circuit is closed only when relay 77 is energized and relay 90 is de-energized. As shown in Figure 1, the magnetic valve 82 is located at a station D which is disposed near to the station A. Between stations A and D is a loading station C.

Prior to applying the fuzes 60 to spindles 10, the plungers thereof are suitably magnetized.

From the foregoing it will be understood that by driving the shaft 55 continuously the apparatus 3 will be caused to operate automatically except for manually loading fuzes 60 into the spindles 10 at the station C. The brackets 69 are arcuately shaped and are curved up and over the disk 5 and the pairs of holders 71 are so arranged that the coils 72, supported thereby, are located so that the spindles 10 and the fuzes 60, contained therein, are movable between the pairs of coils 72. Assuming all of the spindles to be supporting fuzes 60 and the friction wheels 58 and 59 to be driven by shaft 55, the spindles 10 at stations A and B will be rotated at different speeds. The spindle 10 at station A will be driven at the higher rate of speed sufficient to move the plungers 64, of the fuze 60 outwardly if they are functioning correctly. This will induce an alternating current in the coils 72, at station A, which is sufficient to unbalance the bridge 74. As a result, a voltage appears across the bridge terminals to which amplifier-relay 77 is connected, to thereby energize the same, close its output contacts and energize lamp 81. This will indicate correct functioning of the plungers of the fuze, located at station A, and the current will flow through conductor 79 to the magnetic valve 82 provided that amplifier-relay 90 remains de-energized. The coils 72, at station B, are adapted to have induced therein a voltage when plungers 64, of the fuze 60, are moved to radially outward position in response to the slower rate of rotation at station B. As previously explained, this rate is a little less than the rate which will move the plungers 64 outwardly in a properly-operating fuze. In short, if the fuzes at testing stations A and B are in correct or normal operating condition, a voltage will be induced in coils 72' to unbalance bridge 74, energize amplifier-relay 77, and close its output contacts, while no effective voltage will be induced in coils 72 and bridge 86 will remain balanced, amplifier relay 90 will remain de-energized, and its contacts will remain closed. Of course, when amplifier-relay 90 is de-energized and its output contacts are closed, signal lamp 93 is energized. In other words, when properly-operating fuzes are being tested, at stations A and B, both lamps 81 and 93 will be energized, as well as the solenoid of valve 82 and electromagnets 20 and 24. On the other hand, when either or both fuses are defective, the coil and electromagnets will remain de-energized. Furthermore, if the defective fuze is at station A, lamp 81 will not light, while if the fuze at station B is defective, lamp 93 will go out. Thus if either lamp is energized, it indicates a properly-operating fuze at the corresponding station while a cold lamp indicates a defective fuze at that station.

Assuming that the fuzes at both stations A and B in their intended manner, electromagnet 24 will be energized to attract the core 23 and thereby release the disk 5, and at the same time the electromagnet 20 will be energized to attract its core 27 to cause the pawl to move the ratchet wheel 7 and disk 5 through the angle between two radii from the center of disk 5 to the axes of rotation of two adjacent spindles 10. Thus the spindle 10, located at station B is rotated away from said station, while the spindle, previously located at station A is moved to station B. Similarly, the spindle previously located at station C and which has just been manually loaded with a fuze 60, to be tested, is moved to station A; and an empty spindle is moved from station D to station C, to be manually reloaded. At the same time that electromagnets 20 and 24 are energized, the electromagnetic valve 82 is likewise energized and thereby opened, causing a blast of air to be ejected from the nozzle of the conduit 84 into bore 94 of a spindle 10 from which the air blast passes through the restricted ports 95 into the socket 68 for blast ejecting the fuze 60, which has been previously tested, at the stations A and B. Thus it will be readily apparent that except for manually reloading the fuzes at station C, the apparatus 3 will operate automatically to intermittently test, move and eject the tested fuzes. Furthermore, the intermittent step by step movement of the fuzes 60 will substantially simulate the agitation resulting from normal transportation and handling, to ascertain if the plungers will function correctly after being subjected to such treatment.

When either fuze being tested at station A or station B is defective, the electromagnets 20 and 24 will not be energized and disk 5 will remain fixed. Testing may be resumed by stopping the motor driving shaft 55, removing the defective fuze, and replacing it with a fuze known to be perfect. The motor is then started, the disk 5 will be advanced one step and testing may be resumed.

Various modifications and changes are contemplated and may obviously be resorted to without departing from the spirit and scope of the invention, as hereinafter defined by the appended claims, as only a preferred embodiment thereof has been disclosed.

I claim:

1. A fuze testing apparatus for testing the functioning of magnetized arming elements of said fuze, movable to fuze arming position in response to a predetermined minimum speed of rotation of said fuze, comprising, a holder for containing a fuze, means for rotating said holder at said minimum speed, inductive coil means adjacent said holder and adapted to have a voltage induced therein by said elements when the latter are in fuze-arming position, electrically energized signal means, and a circuit connecting said coil means and said signal means, said circuit including an amplifier and normally balanced bridge, said bridge becoming unbalanced to energize said amplifier and pass current to said signal means when voltage is induced in said inductive coil means.

2. A fuze testing apparatus as recited in claim 1, a support for a plurality of said fuze holders, and electrically operated means energizable to move said support to successively present fuzes therein for rotation by said means for rotating, said electrically operated means being operated in response to energization of said amplifier.

3. A testing apparatus comprising a plurality of holders, means for rotating said holders at different speeds, said holders having sockets for containing elements to be tested, said elements including centrifugally actuated magnetized parts adapted to be actuated by centrifugal force when the elements are rotated, inductive coil means located adjacent the elements being tested whereby current is induced by the magnetized parts when so actuated, a balanced bridge connected in a circuit of each of said inductive coil means and unbalanced by the induced current therefrom, and electrically operated conveyor means energized by the current passing the bridges for intermittently moving the holders into and out of positions to be rotated.

4. An apparatus, as in claim 3, a normally open relay in the circuit of the holder rotating at higher speed and energized to close the output contacts thereof by unbalance of the bridge thereof, a normally closed relay in the circuit of the holder rotating at lower speed and having its output contacts opened by unbalance of the bridge thereof, and a circuit including in series the output contacts of said relays and said electrically operated means, whereby said conveyor means is energized when current is induced only in said inductive coil means adjacent the fuze rotating at higher speed.

5. In an apparatus for testing a fuze wherein a magnetized arming element is moved to arming position radially of an axis in response to a predetermined minimum speed of rotation about said axis, a holder adapted to receive and rotate said fuze about said axis, power means for rotating said holder at said minimum speed, inductive coil means adjacent said fuze and adapted to have a voltage induced therein when said element is in arming position, a normally balanced bridge including said inductive coil means, a relay controlled by said bridge and energized by said bridge when unbalanced as a result of voltage induced in said inductive coil means, electrically-energized signal means, and a circuit including the output of said relay and said signal means whereby the latter is operated in response to voltage induced in said inductive coil means.

6. In an apparatus for testing a fuze having a magnetized arming element movable outwardly to arming position from an axis of rotation of said fuze, in response to a predetermined minimum speed of rotation about said axis, a support adapted to mount said fuze for rotation about its said axis and operable to position said fuze at a testing station, means to rotate said fuze when at said station at a speed in excess of said predetermined minimum, an induction coil positioned adjacent said fuze when at said station, said coil being inductively related with said arming element only when said element is in arming position, a normally balanced bridge connected in circuit with said coil to be unbalanced thereby in response to a voltage induced therein, relay means controlled by said bridge and electrically operated signal means connected in the output circuit of said relay means and operated in response to voltage induced in said induction coil.

7. In a device for testing fuzes having centrifugally operated magnetized elements movable radially outwardly in response to a predetermined speed of rotation of said fuzes to arm the same, a movable support, first means carried by said support to mount a first fuze for rotation about its axis, second means carried by said support to mount a second fuze for rotation about its axis, means driving said first and second means at speeds greater and less respectively than said predetermined speed, inductive coil means mounted adjacent each said fuze and adapted to have a voltage induced therein by said elements only when said elements are in radially outward position, releasable locking means for said movable support, a circuit energizable to release said locking means, and means for energizing said circuit only when said inductive coil means at said first fuze has a voltage induced therein and said inductive coil means at said second fuze has substantially no voltage induced therein.

8. In an apparatus for testing fuzes each having a magnetized arming element movable radially outward of an axis of rotation to arm said fuze in response to a predetermined rate of rotation about said axis, a base, a support adapted to support a plurality of fuzes for rotation on parallel axes and movable to locate said fuzes in succession at first and second testing stations, means to rotate a first fuze at said first station at a speed in excess of said predetermined rate, means to simultaneously rotate a second fuze at said second station at a rate less than said predetermined speed, first and second coil means each mounted on said base adjacent a respective one of said first and second fuzes, each said coil means being in inductive relation with an arming element of a respective fuze only when said element is in radially outward position, a normally open first relay in circuit with said first coil means, a normally closed second relay in circuit with said second coil means, electrically operated means for moving said support to move a fuze at said second station away therefrom and to advance a fuze at said first station to said second station, and circuit means controlled jointly by said relays for operating said support moving means.

9. In a device for simultaneously testing a pair of fuzes each having a magnetized arming element movable to arming position radially of an axis of said fuze in response to a predetermined minimum speed of rotation of said fuze about its axis, a base, a disk journaled on said base on a first axis normal to said disk, a plurality of holders journaled on said disk on respective axes equally angularly spaced about said first axis, each holder being adapted to receive and hold a fuze for rotation about its axis, power driven means for rotating a holder at a first station on said base, at said predetermined minimum speed, and for simultaneously rotating a next adjacent holder at a second station on said base, at a speed less than said minimum speed, a first normally balanced bridge including first inductive coil means carried by said base adjacent a holder at said first station, a second normally balanced bridge including a second inductive coil means adjacent a holder at said second station, each said bridge being unbalanced only when a voltage is induced in its inductive coil means by rotation of an adjacent fuze to move its said element to arming position, a first normally open relay responsive to unbalance in said first bridge, a second normally closed relay responsive to unbalance in said second bridge, means energizable to pivot said disk about said first axis to move said holder at said second station away therefrom and to advance the holder at said first station to said second station, and a control circuit for said advancing means and including in series said advancing means and the output of said first and second relays.

10. A testing apparatus comprising first and second holders, means for rotating said holders at different speeds, each holder having a socket for receiving and supporting an element to be tested, each element including magnetized parts adapted to be moved radially outwardly in response to a predetermined centrifugal force when the element is rotated, inductive coil means located adjacent the elements being tested whereby current is induced by the magnetized parts when moved radially outwardly, two balanced bridges, each connected in a respective circuit of a respective induction coil means and unbalanced by voltage induced therein, a normally open relay in circuit with the inductive coil means of the holder rotating at higher speed and energized to close the output contacts thereof by unbalance of the bridge thereof, a normally closed relay in circuit with the inductive coil means of the holder rotating at lesser speed and having output contacts opened by unbalance of the bridge thereof, electrically operated conveyor means for intermittently moving the holders into and out of positions to be rotated, electrically operated releasable locking means for said conveyor means, and a circuit including in series said conveyor means, locking means, and output contacts of said relays whereby said conveyor means and locking means are operated only when said normally open relay is energized and said normally closed relay is deenergized.

LEO T. MEISTER.

REFERENCES CITED

The following references are of record in the file of this patent:

UNITED STATES PATENTS

| Number | Name | Date |
|---|---|---|
| 1,611,224 | Nyquist | Dec. 21, 1926 |
| 1,805,192 | Smith | May 12, 1931 |
| 1,983,388 | Moore | Dec. 4, 1934 |
| 1,984,031 | Purdy | Dec. 11, 1934 |
| 2,162,009 | Goldsmith | June 13, 1939 |
| 2,303,424 | Bendz | Dec. 1, 1942 |
| 2,315,287 | Holloway | Mar. 30, 1943 |
| 2,318,856 | Hoffman | May 11, 1943 |
| 2,355,092 | Meister | Aug. 8, 1944 |
| 2,421,036 | Meister | May 27, 1947 |